US008253790B1

(12) United States Patent
Trent et al.

(10) Patent No.: US 8,253,790 B1
(45) Date of Patent: Aug. 28, 2012

(54) CYLINDER STROKE SYSTEM WITH LASER PROXIMITY DETECTOR

(75) Inventors: David Trent, Cypress, TX (US);
Michael Jacob Gross, Houston, TX (US); Charles Clarence Trent, San Antonio, TX (US)

(73) Assignee: Drilling Technological Innovations, LLC, Houston, TX (US)

( * ) Notice: Subject to any disclaimer, the term of this patent is extended or adjusted under 35 U.S.C. 154(b) by 0 days.

(21) Appl. No.: 13/159,899

(22) Filed: Jun. 14, 2011

Related U.S. Application Data

(60) Provisional application No. 61/354,381, filed on Jun. 14, 2010.

(51) Int. Cl.
*H04N 7/12* (2006.01)
(52) U.S. Cl. .................. 348/82; 348/85; 175/5; 175/27; 173/4; 114/213; 114/256; 114/264; 114/265; 92/10; 92/143
(58) Field of Classification Search ................ 175/5, 27; 173/4; 114/213, 256, 264, 265; 92/5, 10, 92/143; 348/82, 85
See application file for complete search history.

(56) References Cited

U.S. PATENT DOCUMENTS

| | | | |
|---|---|---|---|
| 3,804,183 | A | 4/1974 | Duncan et al. |
| 4,351,261 | A | 9/1982 | Shanks |
| 5,209,302 | A | 5/1993 | Robichaux et al. |
| 6,484,620 | B2 | 11/2002 | Arshad et al. |
| 6,710,327 | B2 | 3/2004 | Arshad et al. |
| 6,769,349 | B2 | 8/2004 | Arshad et al. |
| 6,817,422 | B2 | 11/2004 | Jordan |
| 7,316,176 | B2 | 1/2008 | Dunn et al. |
| 7,588,393 | B1 | 9/2009 | Shivers, III et al. |
| 7,654,327 | B1 | 2/2010 | Shivers, III et al. |

*Primary Examiner* — Jay Patel
*Assistant Examiner* — Geepy Pe
(74) *Attorney, Agent, or Firm* — Buskop Law Group, PC; Wendy Buskop (57) ABSTRACT

A cylinder stroke system with a laser proximity detector including a pressure containing tube. The pressure containing tube can include a first tube end and a second tube end. A cylinder rod can be movably disposed within the pressure containing tube. The system can also include a piston disposed on the cylinder rod first end; a first fluid port formed in the pressure containing tube; a second fluid disposed within the pressure containing tube; a blind end cap and mount; a laser secured to the pressure containing tube; at least one optic guide; a lens separating the at least one optic guide from the second fluid. The cylinder stroke system can also include a camera in communication with a main controller. The camera can receive the reflection from the piston and convert the reflection into a reflection signal.

15 Claims, 7 Drawing Sheets

CYLINDER STROKE SYSTEM WITH LASER PROXIMITY DETECTOR

CROSS REFERENCE TO RELATED APPLICATIONS

The present application claims priority to and the benefit of U.S. Provisional Patent Application Ser. No. 61/354,381 filed on Jun. 14, 2010, entitled "CYLINDER STROKE SYSTEM WITH LASER PROXIMITY DETECTOR". This reference is hereby incorporated in its entirety.

FIELD

The present embodiments generally relate to a cylinder stroke system with a laser proximity detector for determining the location of a cylinder rod for a cylinder during withdrawal or extension of the cylinder rod.

BACKGROUND

A need exists for an accurate cylinder stroke system that can determine the position of a piston portion of a cylinder rod with an accuracy of 0.01 of an inch.

A further need exists for a rugged seaworthy cylinder that can be used in a tensioner assembly for supporting oil platforms and can accurately detect the location of the cylinder rod, thereby preventing oil spills, tilting of the platform, and accidents on offshore oil rigs.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that the system and method can be practiced or carried out in various ways.

The present embodiments relate to a cylinder stroke system with a laser proximity detector.

The cylinder stroke system with the laser proximity detector can have or use a pressure containing tube. The pressure containing tube can have a first tube end and a second tube end.

The pressure containing tube can have a length from about one meter to about thirty meters, and an inner diameter from about 0.1 meters to about 0.8 meters.

The pressure containing tube can have a cylinder rod that can move in and out of one side of the pressure containing tube. The cylinder rod can have a cylinder rod first end and a cylinder rod second end. In embodiments, the cylinder rod can be a hollow steel tube.

In one or more embodiments, the cylinder rod can have an outer diameter in proportion to the length of the pressure containing tube that ranges from about 1:60 rod diameter to tube length to about 1:24 rod diameter to tube length. The length of the cylinder rod can be from about 40 percent to about 60 percent the overall length of the pressure containing tube.

A cylinder head can be connected to the second tube end. The cylinder rod can moveably pass through the cylinder head. A cylinder head seal can be disposed adjacent the cylinder head and within the pressure containing tube. The cylinder head seal can seal any fluid disposed in the pressure containing tube around the cylinder rod in the pressure containing tube, thereby preventing any leakage. The cylinder head seal can be formed in part from an elastomeric material, a synthetic rubber, a natural rubber, a metal, or combinations thereof. For example, the cylinder head seal can be a rubber coated metal disc.

A piston can be disposed or positioned at a top of the cylinder rod first end. The piston can be disposed on the cylinder rod first end to provide a barrier between a first fluid in the pressure containing tube and a second fluid in the pressure containing tube.

The piston can have an outer diameter that can provide a sliding fit with an inner diameter of the pressure containing tube. The piston can be fixed to the cylinder rod.

A first fluid port can allow the first fluid to flow from a first fluid source. The first fluid source can be a tank in the pressure containing tube. The first fluid can flow into the pressure containing tube and around the cylinder rod. The first fluid can be a hydraulic fluid, hydraulic oil, air, or an inert gas.

The second fluid can be a compressible fluid, such as a gas or a vapor, an inert gas, such as nitrogen, helium, or argon. The vapor can be a dry nitrogen that can be disposed within the pressure containing tube on a side of the pressure containing tube opposite the side containing the cylinder rod. The second fluid can be isolated from the first fluid by the piston.

A blind end cap and mount can be affixed to the first tube end. The blind end cap and mount can have two components, including a cap portion and a mount portion. The cap portion can have a hole for mounting. The mount portion can engage the first tube end. In embodiments, the mount portion can have a diameter larger than the cap portion. In embodiments, the blind end cap and mount can be a one-piece construction made from a rigid and durable material, such as steel.

A laser can be mounted to the pressure containing tube. The laser can generate a beam. A camera can be mounted adjacent to the laser. The laser and the camera can be contained within a laser housing, thereby providing protection, such as resistance to impacts and protection from water. In embodiments, the laser can be mounted parallel to the pressure containing tube.

The laser can produce a beam that can pass through at least one optic guide. In embodiments, three optic guides can be used within the second fluid of the pressure containing tube to provide contact with the piston and to cause a reflection. The reflection can pass back through the optic guides to the camera to be captured by the camera.

The camera can be in communication with a controller. The controller can be a main controller, a laser controller, or combinations thereof. The camera can convert the reflection to a reflection signal that can be transferred to the controller.

The controller can use computer instructions to determine a position of the cylinder rod in the pressure containing tube.

The accuracy of the determination of the position of the cylinder rod in the pressure containing tube can be from about 0.1 percent to about 2 percent of at least one calibration baseline of the beam in view of any particulate or oil buildup on the lens.

The laser controller can adjust the beam in view of preset data for the cylinder rod and can change the beam to improve accuracy of the reflection signal. The preset data can include a preset velocity for the cylinder rod.

In one or more embodiments the beam can have a constant frequency that can be calibrated using the laser controller. For example, the laser controller can have computer instructions for providing harmonic diagnostic procedures that can adjust the beam to a composition of the second fluid.

At least one optic guide can be disposed through the cap portion for directing the beam from the laser, through the second fluid, and into contact with the piston, thereby causing the reflection of the beam from the piston.

A lens can be disposed or used at the end of the optic guide. The lens can be disposed adjacent the second fluid and can separate the optic guides from the second fluid.

In embodiments, the laser housing can be disposed about the laser. The camera can be formed from steel, a reinforced composite, or a polymer, thereby providing water-resistance and explosion-resistance for the laser and the camera. The laser housing can have water-resistance at a depth of up to about 30 meters.

The laser housing can have an interface plug for connecting the laser and the camera in the housing with the main controller and/or the laser controller.

The main controller can have a data storage with computer instructions therein for instructing a processor to compare the reflection signal to a preset velocity. The processor can also use cylinder rod data in the data storage to determine a position of the cylinder rod in a stroke cycle of the cylinder rod relative to the pressure containing tube.

The optic guide, or plurality of optic guides, can be at least partially contained within an optic guide housing. The optic guide housing can be disposed about the optic guide. At least part of the optic guide can be disposed in the mount of the blind end cap and mount. At least part of the optic guide can be external to the pressure containing tube.

A first optic guide can guide the beam from the laser to a first redirectional surface. The redirectional surface can be a mirror, a prism, a reflective plate, or another surface that can redirect the beam at an angle, such as a 90 degree angle.

A second optic guide can direct the re-directed beam to a second redirectional surface. The second redirectional surface can be a prism, a mirror, a reflective plate, a reflective lens, a steel plate, a gold coated plastic plate, a similar material, or combinations thereof. The second redirectional surface can accurately redirect the laser beam at an angle. The angle can be an angle from about 120 degrees to about 60 degrees.

The optic guides can have different diameters. In one or more embodiments, the optic guides can have a diameter that is wide enough to accommodate the beam.

The twice redirected beam can be guided through a third optic guide to a lens. The lens can be supported by a lens retainer and can be encircled by a vapor diverter. The vapor diverter can be attached around one of the optic guides adjacent the lens for receiving any particles suspended in the second fluid.

The beam can then enter the second fluid to contact the piston, forming a reflection that can pass back through the lens, through the redirectional surfaces, through the optic guides, and to the camera adjacent the laser.

In one or more embodiments, the camera can be spaced apart from the laser, and can be proximate to the lens.

In one or more embodiments, at least one redirectional surface can be used between any two optic guides.

One or more embodiments can include a pressure isolation flange can be that can be used to connect the optic guide to the laser.

In one or more embodiments, the main controller can have a power supply, such as a rechargeable battery supply or a connection to a reliable 110 volt source. The main controller can have a user interface display that can be connected to the power supply. The main controller can have a circuit board that can be connected to the user interface display and to the power supply. The main controller can have a processor and a data storage in communication with the processor. The processor can be in communication with the circuit board.

The data storage can have computer instructions for comparing a current value representing the reflection to a preset value associated with a stroke distance for the cylinder rod in the pressure containing tube to determine a position of the piston in the pressure containing tube. Additional computer instructions within the main controller data storage can be used for comparing the reflection signal to a preset velocity for the cylinder rod.

The method can include calibrating the laser to determine a limit of a fully extended cylinder rod in a pressure containing tube of a cylinder stroke system. The laser can also be calibrated to determine a limit of a fully retracted cylinder rod in the pressure containing tube of the cylinder stroke system.

After calibration, the method can include projecting a beam from the laser through at least one optic guide, through a lens, and to a piston connected to the cylinder rod. The beam, upon contacting the piston, can form a reflection that can travel back through the lens, through optic guide, and to a camera associated with the laser. The camera can convert the reflection into a reflection signal, also referred to herein as a "current value". The current value can then be transmitted to the main controller.

The data storage of the main controller can have computer instructions for instructing the processor to compare the current value to a preset value associated with a stroke distance for the cylinder rod in the pressure containing tube to determine a position of the piston in the pressure containing tube.

The method can include using additional computer instructions to instruct the processor to use harmonics with the beam to correct the reflected signal based on characteristics of the piston, thereby forming a corrected reflected signal.

One or more embodiments of the method can include using harmonics with the reflected signal to accommodate surface characteristics of the piston, thereby forming a corrected beam.

The method can include using computer instructions in the data storage of the main controller to change a frequency or a pulse width of the beam using on the corrected reflected signal.

The method can be used to determine positions of cylinder rod moving at velocities up to 10 meters per second.

In embodiments, the main controller can be in communication with a network, such as the Internet™, a satellite network, a cellular network, a similar network, or combinations thereof. The main controller can be in communication with a plurality of client devices through the network for simultaneous remote monitoring of the cylinder rod.

The method can include using two lasers on a single pressure containing tube; thereby providing a backup if one of the lasers fails during operation and ensuring safety of the offshore drilling platform.

In operation, the first fluid can flow through the first fluid port and into the pressure containing tube. The first fluid within the pressure containing tube can exert a pressure upon the piston, thereby moving the piston in a first direction towards the portion of the pressure containing tube containing the second fluid and the laser proximity detector. The movement of the piston can cause a corresponding movement of the cylinder rod in the first direction. The movement of the cylinder rod can cause a corresponding movement and/or tensioning of equipment that is connected to the cylinder rod, such as at the shackle pin of the cylinder rod. When the pressure of the second fluid within the pressure containing tube is greater than the pressure of the first fluid within the pressure containing tube, the piston can move in a second direction, wherein the second direction can be opposite the first direction. During operation and movement of the piston, the cylinder rod, and any equipment connected thereto, the laser can continually, continuously, or periodically transmit a beam to the piston, cylinder rod, or another portion of the assembly to determine the position of the piston, cylinder rod, or equipment connected thereto.

Figure 1:
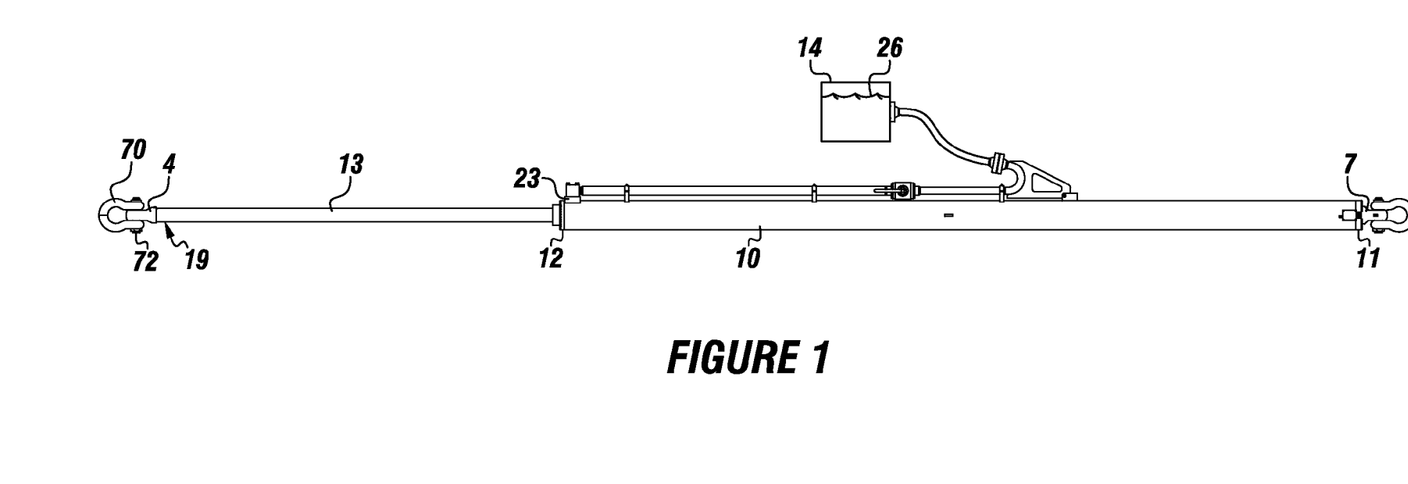
FIG. 1 is a side view of a pressure containing tube for tensioning a structure.

Turning now to the Figures, FIG. 1 is a perspective view of a pressure containing tube 10 for tensioning a structure.

The pressure containing tube 10 can have a first tube end 11 and a second tube end 12. A cylinder rod 13 can extend from the second tube end 12. A cylinder rod second end 19 can connect to a first blind end cap and mount 4. The first blind end cap and mount 4 can engage a shackle 70 secured to the cylinder rod second end 19 with a shackle pin 72.

The first tube end 11 can engage a second blind end cap and mount 7.

A first fluid 26 from a first fluid source 14 can flow into the pressure containing tube 10 through a first fluid port 23.

Figure 2:
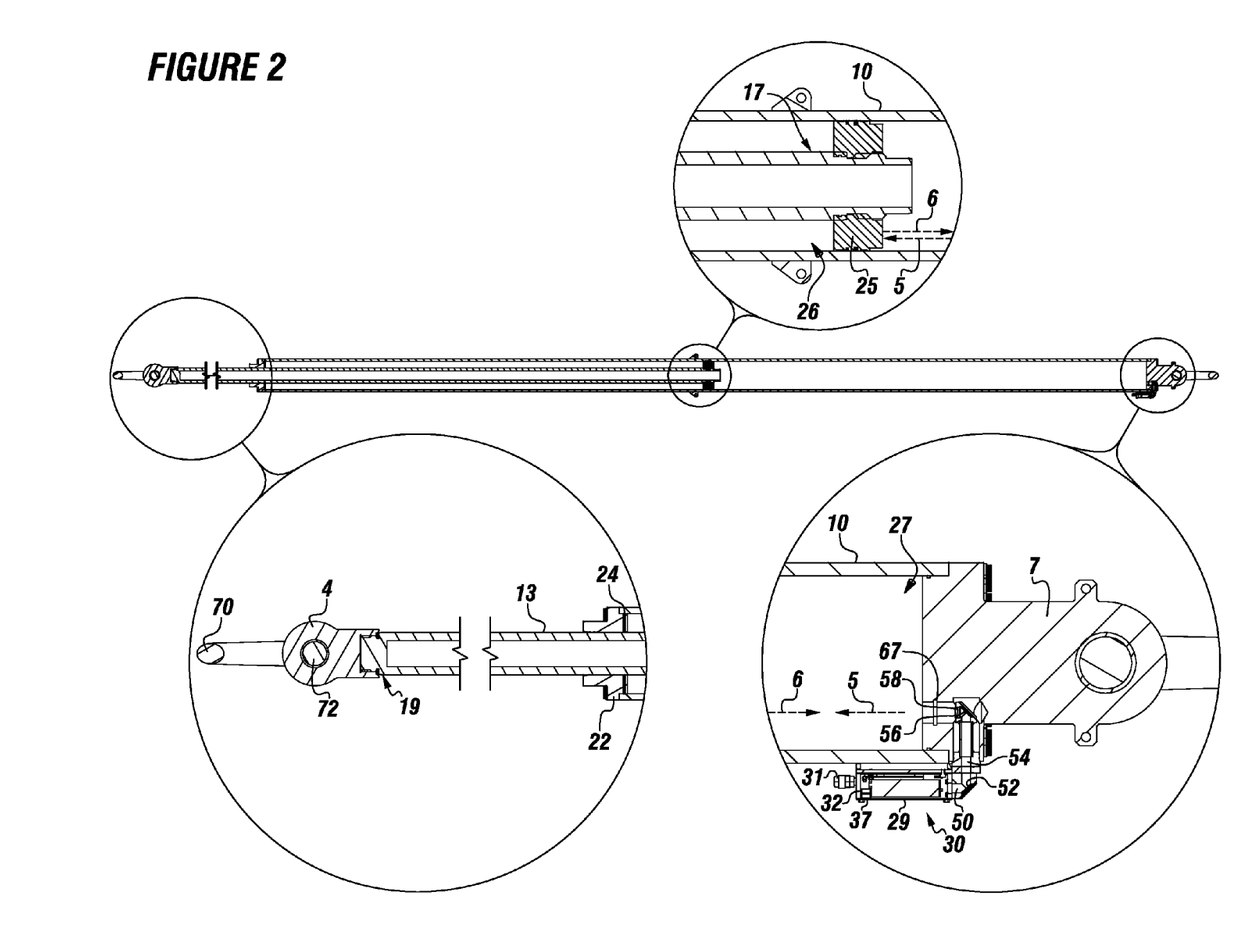
FIG. 2 is a cross sectional view of the pressure containing.

FIG. 2 is a cross sectional view of the pressure containing tube 10.

The cylinder rod 13 can have a cylinder rod first end 17 that can engage a piston 25. The cylinder rod first end 17 can support the piston 25.

A second fluid 27 can be separated from the first fluid 26 by the piston 25 and the cylinder rod 13.

The pressure containing tube 10 can have a cylinder head 22 and a cylinder head seal 24 for providing a leak-free engagement with the cylinder rod 13 during operation with a hydraulic fluid or a pneumatic gas.

The second blind end cap and mount 7 can have a hole 46 that can engage a shackle pin.

A laser 30 can connect to the second blind end cap and mount 7 and to a wall of the pressure containing tube 10. The laser 30 can have a camera 37 inside a laser housing 29 that can have an interface plug 31, allowing the laser to communicate to a main controller. A laser controller 32 can be disposed within the laser housing 29.

A beam 5 from the laser 30 can cause a reflection 6 at the piston 25. The beam 5 can pass from the laser 30, through a first optic guide 50, to a first redirectional surface 52, through a second optic guide 54, to a second redirectional surface 56, through a lens 58, and out into the second fluid 27. The lens 58 can be surrounded by a vapor diverter 67. The optic guides can be housed in the mount portion of the second blind end cap and mount 7.

Figure 3A:
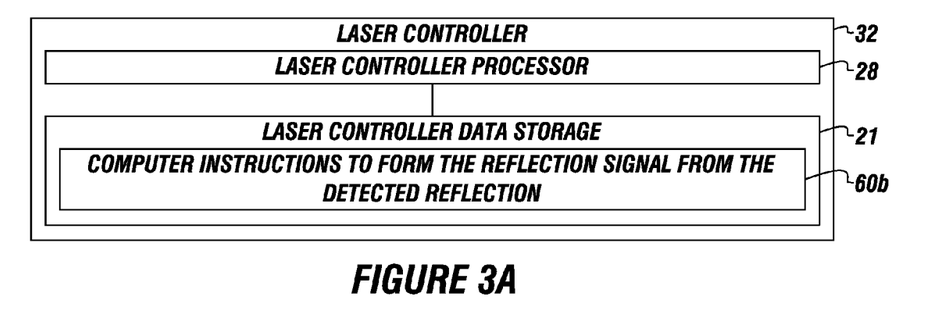
FIG. 3A is a detail of a laser controller.

FIG. 3A shows a detail of the laser controller 32. The laser controller 32 can have a laser controller processor 28 and a laser controller data storage 21 with computer instructions 60b to form the reflection signal from the detected reflection.

Figure 3B:
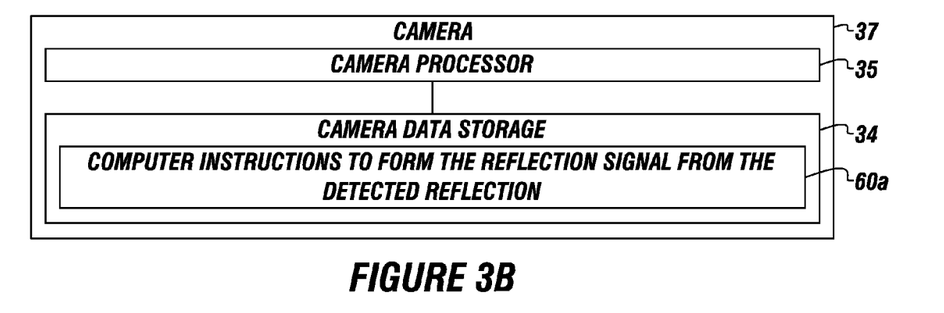
FIG. 3B is a detail of a camera.

FIG. 3B shows a detail of the camera 37. The camera 37 can have a camera processor 35 and a camera data storage 34 in communication with the camera processor 35. The camera data storage 34 can have computer instructions 60a to form the reflection signal from the detected reflection.

Figure 4:
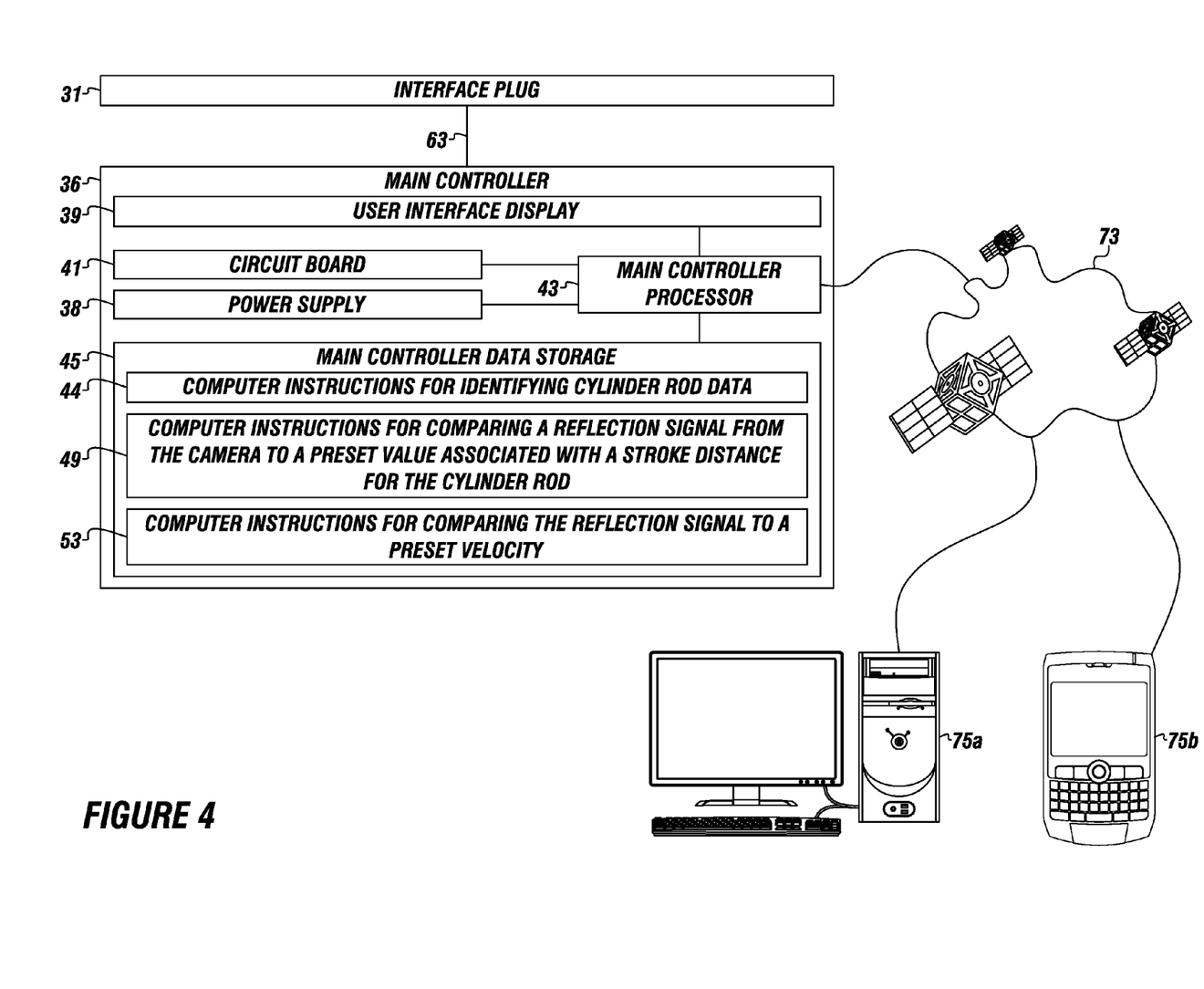
FIG. 4 is a detail of the main controller.

FIG. 4 shows a detail of the main controller 36 connected to the laser through the interface plug 31.

The main controller 36 can have a power supply 38 for operating a main controller processor 43, a circuit board 41, and a user interface display 39.

The main controller processor 43 can be in communication with a plurality of client devices 75a and 75b through a network 73, allowing for continuous, 24 hours a day, updated communication to remote locations concerning the status of each cylinder and stroke.

The main controller 36 can have a main controller data storage 45 with computer instructions stored therein. The main controller 36 can receive a reflection signal 63 from the camera, the laser, or combinations thereof through the interface plug 31.

The main controller data storage 45 can have computer instructions for identifying cylinder rod data 44, computer instructions for comparing a reflection signal from the camera to a preset value associated with a stroke distance for the cylinder rod 49, and computer instructions for comparing the reflection signal to a preset velocity 53.

Figure 5:
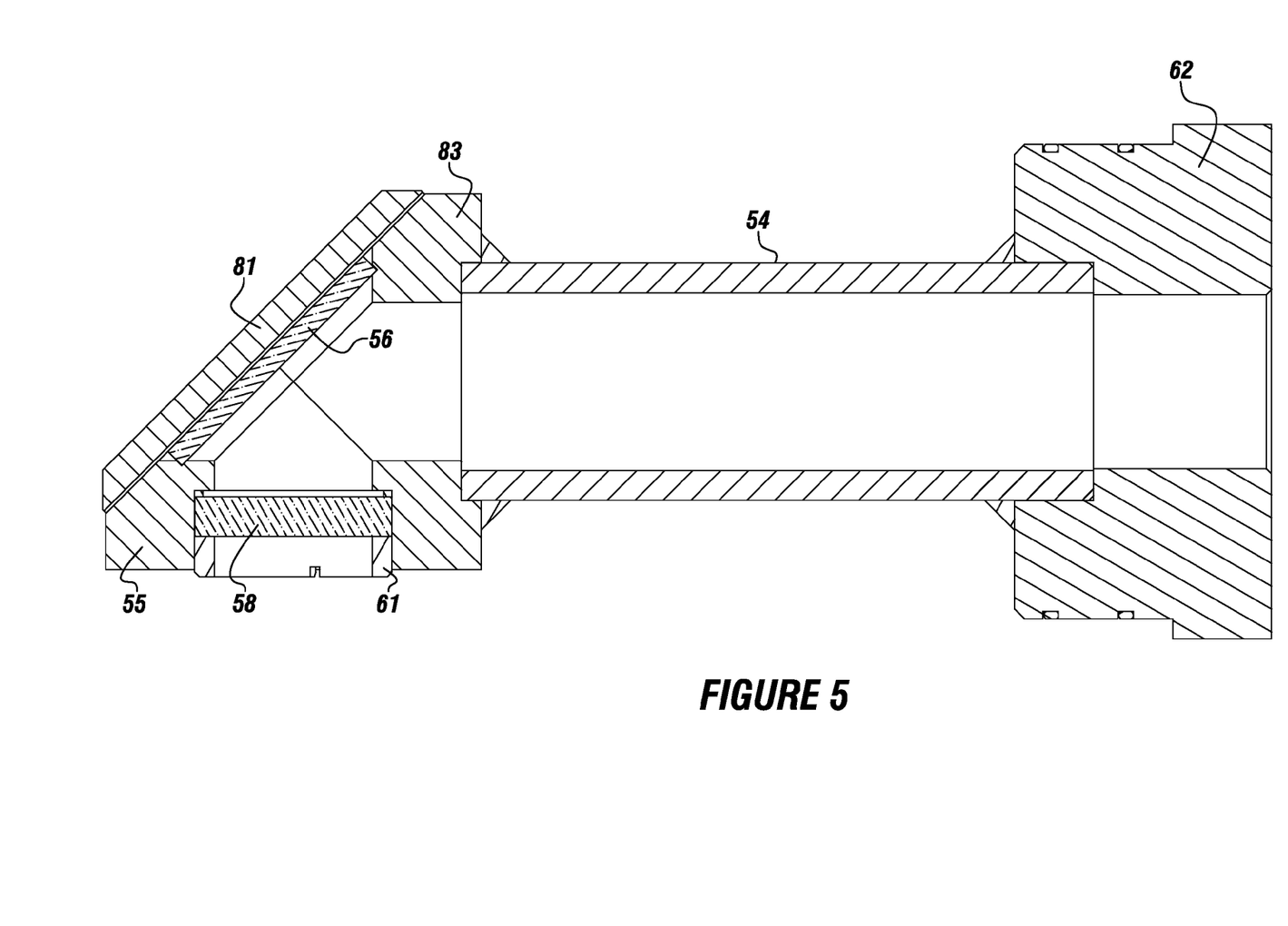
FIG. 5 is a cross sectional view of an optic guide.

FIG. 5 is a cross sectional view of an optic guide.

A lens 58 with a lens retainer 61 can be secured to the optic guide housing 55. The second redirectional surface 56 can be protected by a second external redirectional surface mounting cap 81. The second external redirectional surface mounting cap 81 can be placed over the second redirectional surface mount 83 and the second optic guide 54.

The optic guide can include a pressure isolation flange 62.

Figure 6:
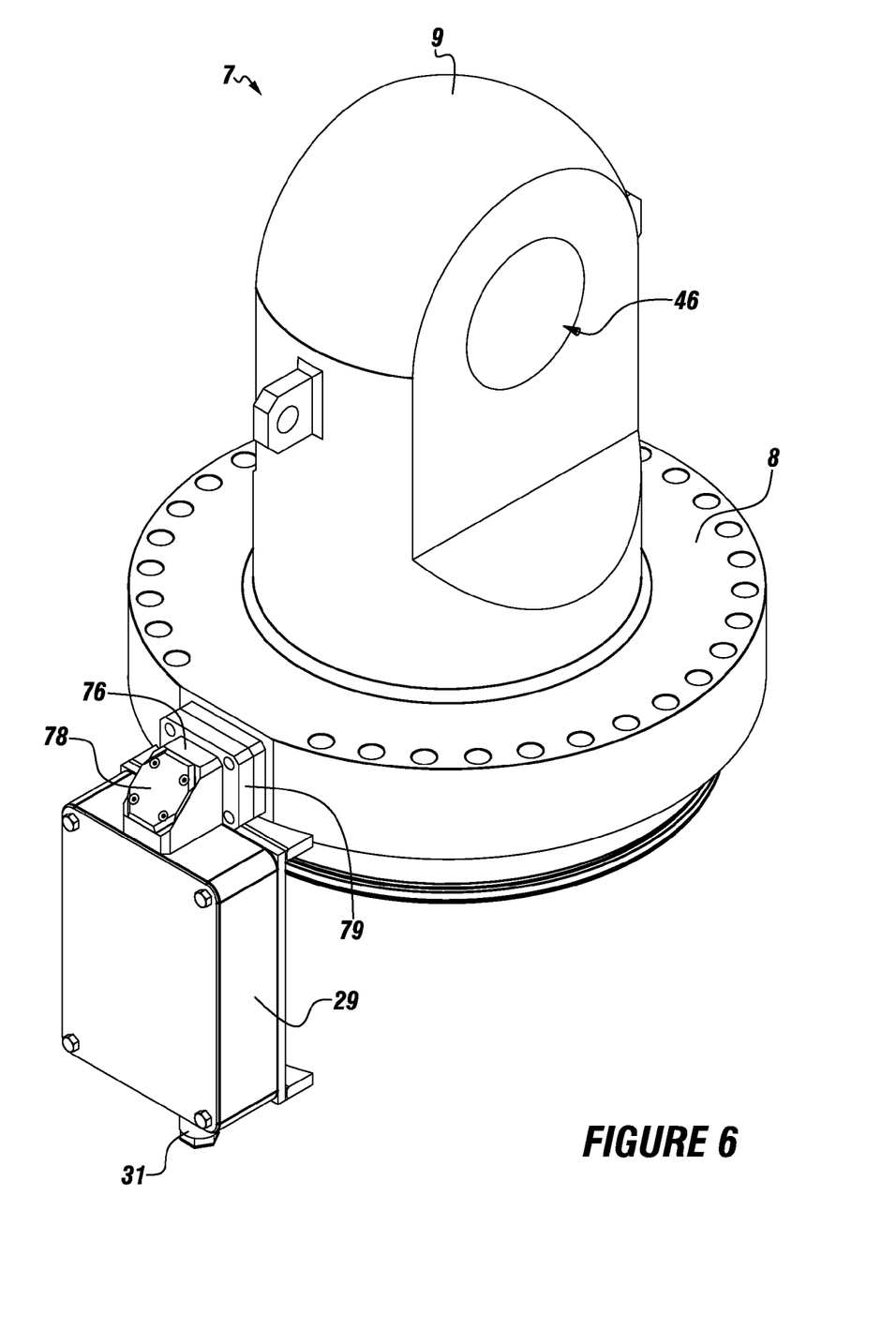
FIG. 6 is a perspective view of a blind end cap and mount.

FIG. 6 is a perspective view of a blind end cap and mount 7 to which the laser can be secured. The mount portion 9 can have a hole 46 for receiving a shackle pin. The mount portion 9 can secure to the cap portion 8.

Also shown are the laser housing 29 which can have the interface plug 31 that can completely surround the laser and the camera.

An external re-directional surface mount 76 can be connected to an external redirectional surface mounting cap 78 and a flange 79. The flange 79 can be used to attach the laser housing 29 to the pressure containing tube.

Figure 7:
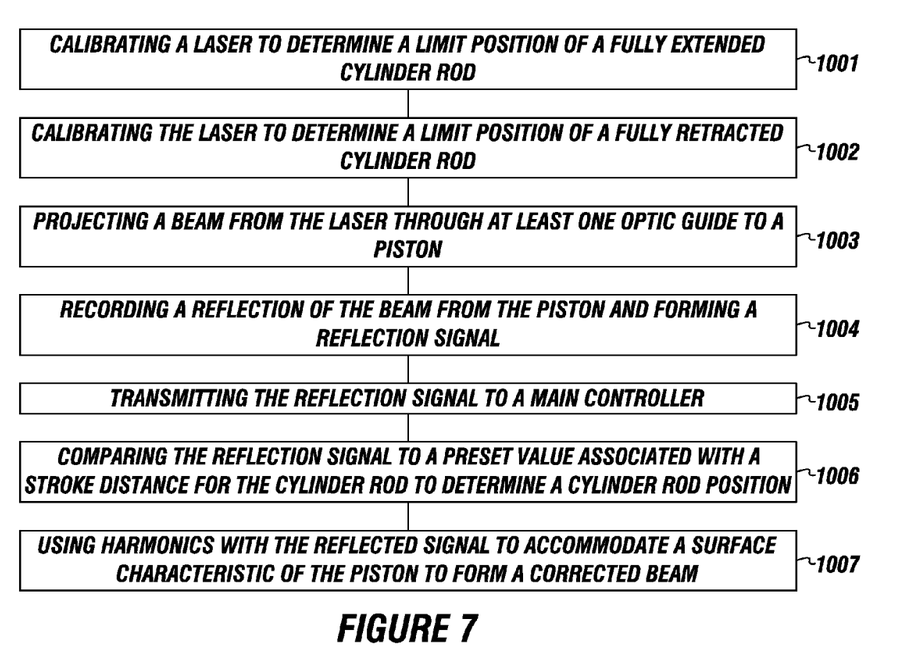
FIG. 7 is a diagram of a method for determining a position of a rod in a cylinder stroke system.

FIG. 7 depicts a flow chart of an embodiment of a method for determining a position of a rod in a cylinder stroke system.

The method can include calibrating a laser to determine a limit position of a fully extended cylinder rod, as illustrated by box 1001.

The method can include calibrating the laser to determine a limit position of a fully retracted cylinder rod, as illustrated by box 1002.

The method can include projecting a beam from the laser through at least one optic guide to a piston, as illustrated by box 1003.

The method can include recording a reflection of the beam from the piston and forming a reflection signal, as illustrated by box 1004.

The method can include transmitting the reflection signal to a main controller, as illustrated by box 1005.

The method can include comparing the reflection signal to a preset value associated with a stroke distance for the cylinder rod to determine a cylinder rod position, as illustrated by box 1006.

The method can include using harmonics with the reflected signal to accommodate a surface characteristic of the piston to form a corrected beam, as illustrated by box 1007.

While these embodiments have been described with emphasis on the embodiments, it should be understood that within the scope of the appended claims, the embodiments might be practiced other than as specifically described herein.

What is claimed is:

1. A cylinder stroke system with a laser proximity detector, the system comprising:
   a. a pressure containing tube comprising a first tube end and a second tube end;
   b. a cylinder rod movably disposed within the pressure containing tube, wherein the cylinder rod comprises a cylinder rod first end and a cylinder rod second end;
   c. a piston disposed on the cylinder rod first end;
   d. a first fluid port formed in the pressure containing tube, wherein the first fluid port is in fluid communication with a first fluid source, and wherein the first fluid port provides a first fluid to the pressure containing tube adjacent the cylinder rod;
   e. a second fluid disposed within the pressure containing tube, wherein the second fluid is isolated from the first fluid by the piston;
   f. a blind end cap and mount having a cap portion connected to the first tube end and a mount portion connected to the cap portion;
   g. a laser secured to the pressure containing tube in communication with a laser controller, wherein the laser generates a beam, and wherein the beam causes a reflection from the piston;
   h. at least one optic guide disposed through the first tube end for directing the beam from the laser and through the second fluid to contact the piston;
   i. a lens separating the at least one optic guide from the second fluid; and
   j. a camera in communication with a main controller, wherein the camera receives the reflection from the piston and converts the reflection into a reflection signal, and wherein the camera transmits the reflection signal to the main controller to determine a position of the cylinder rod in the pressure containing tube.

2. The system of claim 1, wherein the main controller is in communication with the laser controller, and wherein the main controller further comprises computer instructions to instruct the laser controller to adjust the beam in view of preset data for the cylinder rod.

3. The system of claim 1, wherein the first fluid comprises a hydraulic fluid, air, or an inert gas.

4. The system of claim 1, wherein the second fluid comprises a vapor, an inert gas, or combinations thereof.

5. The system of claim 1, wherein the laser is external to the pressure containing tube.

6. The system of claim 1, further comprising a housing disposed about the laser and the camera.

7. The system of claim 1, further comprising an optic guide housing disposed about the at least one optic guide.

8. The system of claim 7, further comprising a plurality of optic guides disposed within the optic guide housing, wherein at least one redirectional surface is disposed between at least two optic guides.

9. The system of claim 8, wherein the at least one redirectional surface is a prism, a mirror, a reflective plate, a lens, or combinations thereof.

10. The system of claim 1, wherein the beam maintains a constant frequency, wherein the constant frequency is calibrated using computer instructions in the laser controller, and wherein the computer instructions in the laser controller provide a harmonic diagnostic procedure that adjusts to a composition of the second fluid.

11. The system of claim 1, further comprising a vapor diverter disposed on the at least one optic guide adjacent the lens for receiving any particles suspended in the second fluid.

12. The system of claim 1, further comprising a lens retainer disposed about the lens.

13. The system of claim 1, further comprising a pressure isolation flange connecting the at least one optic guide to the pressure containing tube.

14. The system of claim 1, wherein the main controller comprises:
   a. a power supply;
   b. a user interface display connected to the power supply;
   c. a circuit board connected to the user interface display and the power supply;
   d. a processor in communication with the circuit board; and
   e. a data storage in communication with the processor, wherein the data storage comprises computer instructions for comparing the reflection signal to a preset value associated with a stroke distance for the cylinder rod in the pressure containing tube to determine a position of the piston in the pressure containing tube.

15. The system of claim 14, wherein the main controller comprises computer instructions for comparing the reflection signal to preset data for the cylinder rod.

* * * * *